March 4, 1958
J. W. KENNEDAY ET AL
2,825,536
RELEASING SOCKET FOR WIRE LINES
Filed July 23, 1956
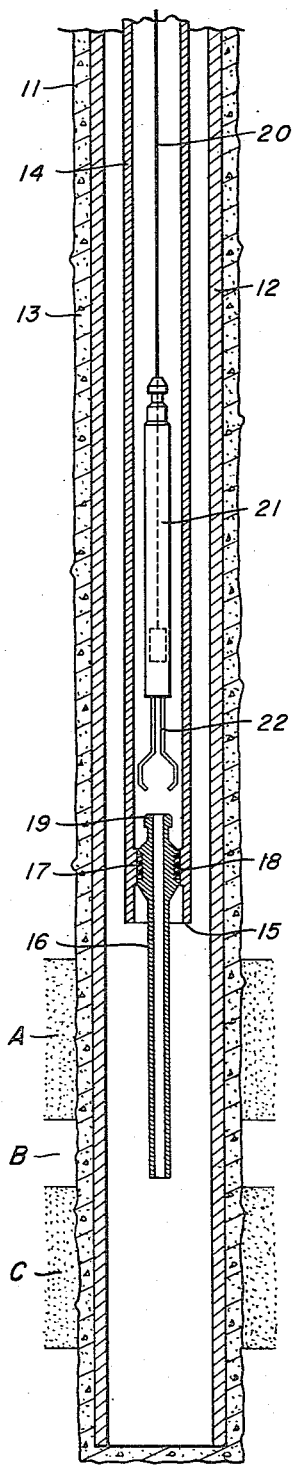
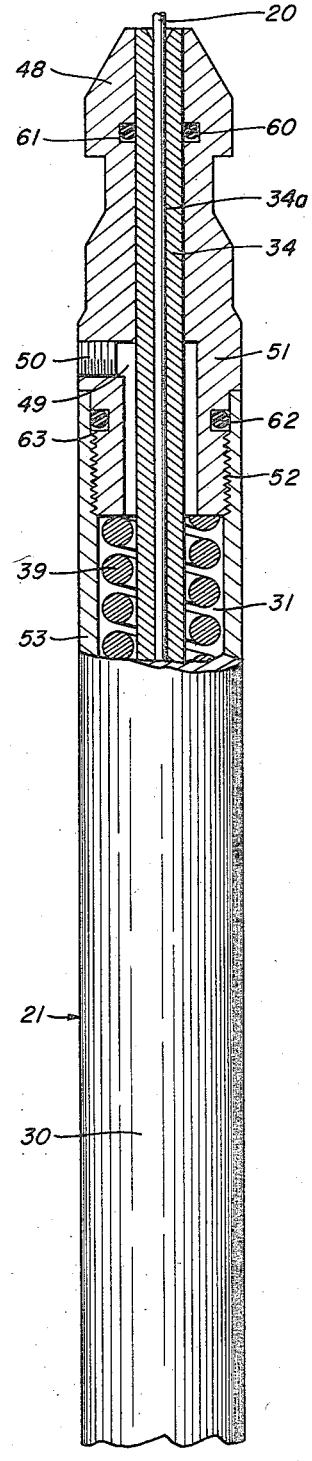
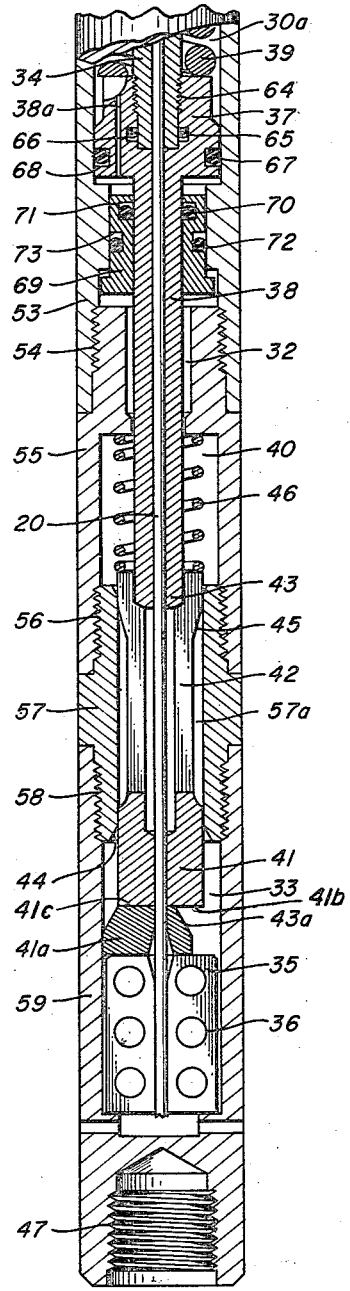
INVENTORS.
John W. Kenneday,
Harold E. McGowen, Jr.,
BY
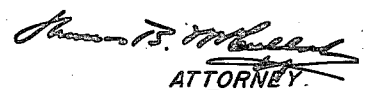
ATTORNEY.

United States Patent Office 2,825,536
Patented Mar. 4, 1958

2,825,536

RELEASING SOCKET FOR WIRE LINES

John W. Kenneday and Harold E. McGowen, Jr., Houston, Tex.; said Kenneday assignor, by mesne assignments, to Esso Research and Engineering Company, Elizabeth, N. J., a corporation of Delaware, and said McGowen assignor to Camco, Incorporated, Houston, Tex., a corporation of Texas Application July 23, 1956, Serial No. 599,563

7 Claims. (Cl. 255—34)

The present invention is concerned with a releasing socket for wire lines. More particularly, the invention is concerned with a device for cutting a wire line attached to a well tool. In its more specific aspects, apparatus is provided which allows the severing of a wire line under a predetermined tension.

The present invention may be briefly described as a releasing socket for a wire line which comprises an elongated body member having a first chamber and a second chamber. A longitudinal member is sealingly positioned in the body member to extend through the chambers. The longitudinal member has an axial passageway for receiving the wire line and means are provided in the lower portion of the body member for clamping the wire line in the body member. A compressible means is arranged in the first chamber which normally urges the longitudinal member to a first position. Means are provided between the first chamber and the second chamber adapted to bleed hydraulic fluid in the first chamber to the second chamber; this means may suitably comprise a properly sized orifice to allow fluid to be bled slowly from the first chamber to the second chamber. Arranged in the body member on the wire line for movement therealong is a cutting member and the body member is provided with a cutting surface in operative relationship with the cutting member for cutting the wire line on movement of the cutting member. The compressible means moves to a second position by tension exerted on the wire line to cause hydraulic fluid to bleed into the second chamber.

The cutting member is suitably arranged between the clamping means and the longitudinal member and means are provided for releasing the cutting member into contact with the cutting surface on limited movement of the wire line with respect to said body member from a first position to a second position. This releasing means is suitably a collet member arranged in the body member operatively engaging the cutting member and the lower end of the longitudinal member. The collet member has expansible means embracing the longitudinal member for releasing the cutting member in contact with the cutting surface. The collet member may be tapered on its outer surface where it embraces the longitudinal member and a biasing means may be provided to urge the collet member into position for maintaining said cutting member out of contact with said cutting surface.

The collet member provided with the expansible means allows the cutting member to be released suddenly after limited movement of the longitudinal member.

The device of the present invention is suitably provided with means on its upper end for engaging a wire line fishing tool and with means on its lower end for attaching the socket to a wire line well tool and the like.

The invention will be further described with reference to the drawing in which:

Fig. 1 is a schematical arrangement of the invention in a cased and tubed well; and Figs. 2 and 2a together comprise a partial sectional detailed view of the device of Fig. 1.

Referring now to the drawing in which identical numerals will be employed to designate identical parts, numeral 11 designates a well bore drilled from the earth's surface, not shown, to penetrate a plurality of earth formations or intervals A, B, and C. These formations, zones, strata, and the like may comprise productive and non-productive intervals. For example, zones A and C may be productive of oil and/or gas and the like and zone B may be non-productive.

A casing, such as 12, is arranged in the well bore 11 and is cemented in place with cement 13. A tubing 14 is run into the casing 12 and is suitably set permanently in the well with its lower open end 15 above the uppermost of the plurality of subsurface intervals penetrated by the well bore 11.

Shown arranged in the tubing 14 is a tubular extension member 16 which forms a flow path from the open end 15 of the tubing 14 to a point above the interval C. This tubular extension member is suitably supported, suspended and/or anchored in a landing nipple, such as 17, and sealed therein by sealing means, such as 18. The upper end of the extension member 16 is provided with a fishing head or connection 19.

Lowered on a wire line 20 from the well head, not shown, is a releasing socket 21, in accordance with the present invention, which is attached to a suitable fishing or grab tool 22, the wire line being suitably connected to the releasing socket 21 as shown in the dotted lines and as will be described in more detail in Figs. 2 and 2a.

Referring now to Figs. 2 and 2a, numeral 21 designates a releasing socket in accordance with the present invention comprising an elongated body member 30. This body member 30 is provided with a cavity 30a divided into a first chamber 31 and a second chamber 32. A third chamber 33 is also provided.

Extending longitudinally and sealingly positioned in the body member is a longitudinal member 34 provided with an axial passageway 34a through which the wire line 20 extends. The wire line 20 extends through the longitudinal member 34 into the lower chamber 33 of the body member 30 and suitably is clamped in the chamber 33 by means of a clamp 35 held together by suitable clamping means 36. Bearing against the upper end of the chamber 31 and against a shoulder 37, which suitably forms part of the lower end 38 of the longitudinally extending member 34, is a spring member 39 which normally urges the longitudinally extending member 34 to a first position in the body member. The shoulder 37 divides the cavity 30a in body member 30 into chambers 31 and 32. The shoulder 37 is provided with an orifice bleed port 38a which allows communication between the chamber 31 and the chamber 32 or from above or below the shoulder 37.

The chamber 32 has an enlarged portion 40 into which the lower end 38 of the elongated member 34 projects or extends. A collet member generally indicated by the numeral 41 is provided with expansible means or fingers 42 which embraces the lower end 43 of the section 38. The collet member 41 is provided with a bottom cutting surface 41b and rests on an eccentric or knife member or cutting element 41a having a top cutting surface 41c which, in turn, is arranged on the clamp 35 for movement on the wire line 20.

In operative relationshp with the cutter element 41a is a tapered camming surface 44 provided in the chamber 33.

The back end of the fingers 42 are suitably tapered by providing a surface 45. This tapered surface 45 taken with a spring means 46 arranged in the enlarged portion 40 allows the collet member 41 to be reloaded automatically as will be described further.

The lower end of the releasable socket 21 is provided with a threaded connecting means 47 which is threadedly connected to a suitable wire line tool which may be a grab hook or other fishing tool or other wire line well tools.

The upper end of the releasable socket 21 has a fishing neck 48 for engaging with a wire line fishing tool.

The chamber 31 has a filling orifice 49 which is suitably closed by a threaded plug 50 for introduction of hydraulic fluid into the chamber 31.

It is to be noted that the device of Figs. 2 and 2a is suitably formed in sections with an upper section 51 being provided with fishing neck 48 and threadedly connected by mating threads 52 to a tubular member 53 which contains chamber 31 which, in turn, is connected by mating threads 54 to an intermediate section 55 enclosing the enlarged portion 40 which, in turn, is threadedly connected by mating threads 56 to a second intermediate portion 57 which is connected by mating threads 58 to the portion 59 of the releasing socket 21. This bottom portion 59 incorporates a chamber 33 and clamp 35 and provides the threaded connection 47. By virtue of the threaded connections at 58 a new wire line 20 may be clamped in the device and the device reassembled.

It is to be further noted that the longitudinally extending member 34 is sealed with sealing means 60 in a recess 61 in the member 51 and with a sealing means 62 in recess 63. The sealing means may suitably be O-rings. Likewise, the member 34 is threadedly connected to the shoulder 37 by mating threads 64 and a sealing member, such as an O-ring 65, is provided in the recess 66 to form a tight seal. Shoulder 37 is also sealed against the wall of the member 53 by sealing means 67 in a recess 68.

A floating collar 69 is arranged in chamber 32 to prevent liquid lock and the floating collar 69 is suitably sealed against the member 38 by sealing means 70 in recess 71; sealing means 72 in recess 73 seals against member 53.

In employing the device of the present invention, it would be suitably employed connected to a well tool, not shown, by threads 47 as illustrated in Fig. 2. The chamber 31 is filled with a suitable hydraulic fluid. The spring means 39 having a predetermined compression is designed to be overcome on exceeding the force of the spring on upward pull on the wire line 20 to the clamping means 35, it being assumed that the tool to which the releasing socket is attached has become stuck. As the clamp 35 has tension exerted on it through the wire line 20, the upward force exerted on the shoulder 37 causes the spring 39 to be compressed which allows hydraulic fluid to be bled through the orifice 38a at a slow rate under the sustained overload. As the expansible or collet fingers 42 move upwardly compressing spring 46, the expansible or collet fingers 42 move into the enlarged space 40 and are allowed to spring outwardly causing the collet member 41 and the knife 41a to be moved upwardly suddenly. Surface 44 coacts with tapered surface 43a on cutter element 41a to center the element 41a. As cutter element 41a is moved toward center the wire line 20 is sheared by cutting action between the bottom surface 41b of element 41 and the top surface 41c of member 41. On severing or shearing of the wire line 20 it may be retrieved. Thereafter, the releasing socket and stuck tool as desired may be retrieved using a stronger wire line than that originally employed.

The combination of the tapered surface 45 and the spring member 46 allows the device to be reloaded when the upward pull is insufficient to sever the wire line 20, the tapered surface allowing the fingers 42 to re-enter the confined space 57a in the member 57.

The device of the present invention is of considerable utility and importance because it allows the wire line to be severed under a predetermined load which allows the retrieving and recovery of expensive wire line which might be parted or broken otherwise at a point where its value might be considerably decreased by virtue of being broken to provide only relative short lengths. The invention has particular importance in the so-called permanent well completion operations where the tubing is set permanently in the well once during the economic life of the well.

The nature and objects of the present invention having been completely described and illustrated, what we wish to claim as new and useful and to secure by Letters Patent is:

1. A releasing socket for a wire line which comprises an elongated body member provided with a cavity therein, a longitudinal member sealingly positioned in said body member, said longitudinal member having an axial passageway for receiving said wire line and means connected to said longitudinal member dividing said cavity into first and second chambers, means in said body member for clamping said wire line, compressible means in said first chamber shouldered on said dividing means and normally urging said longitudinal member to a first position, means adapted to bleed fluid in the first chamber to the second chamber, a cutting member arranged for movement on said wire line between the clamping means and the longitudinal member, and a cutting surface formed by means in said body member in cooperative relationship with said cutting member for cutting said wire line on movement of said cutting member, said compressible means moving to a second position by tension exerted on said wire line to cause fluid to bleed into said second chamber.

2. A releasing socket for a wire line which comprises an elongated body member provided with a first chamber and a second chamber, a longitudinal member sealingly positioned in said body member to extend through said chambers, said longitudinal member having an axial passageway for receiving said wire line, means in said body member for clamping said wire line, compressible means in said first chamber operatively bearing against said longitudinal member and normally urging said longitudinal member to a first position, means between said first chamber and said second chamber adapted to bleed hydraulic fluid in the first chamber to the second chamber, a cutting member arranged for movement on said wire line between the clamping means and the longitudinal member, and a cutting surface formed by means in said body member in operative relationship with said cutting member for cutting said wire line on movement of said cutting member, said compressible means moving to a second position by tension exerted on said wire line to cause hydraulic fluid to bleed into said second chamber.

3. A releasing socket for a wire line which comprises an elongated body member provided with a first chamber and a second chamber, a longitudinal member sealingly positioned in said body member to extend through said chambers, said longitudinal member having an axial passageway for receiving said wire line, means in said body member for clamping said wire line, compressible means in said first chamber operatively bearing against the longitudinal member and normally urging said longitudinal member to a first position, means between said first chamber and said second chamber adapted to bleed hydraulic fluid in the first chamber to the second chamber, a cutting member arranged for movement on said wire line between the clamping means and the longitudinal member, a cutting surface formed by means in said body member in operative relationship with said cutting member for cutting said wire line on eccentric movement of said cutting member, means for releasing said cutting member into contact with said cutting surface on limited movement of said wire line with respect to said body member from a first position to a second position, said compressible means moving to a second position by tension exerted on said wire line to cause hydraulic fluid to bleed into said second chamber.

4. A releasing socket for a wire line which comprises an elongated body member provided with a first chamber, a second chamber and a third chamber, a longitudinal member sealingly positioned in said body member to extend through said first and second chambers, said longitudinal member having an axial passageway for receiving said wire line, means in said body member for clamping said wire line, compressible means in said first chamber operatively bearing against the longitudinal member and normally urging said longitudinal member to a first position, means between said first chamber and said second chamber adapted to bleed hydraulic fluid in the first chamber to the second chamber, a cutting member arranged in said third chamber for movement on said wire line between the clamping means and the longitudinal member, and a collet member arranged in said third chamber having a bottom cutting surface operatively engaging said cutting member on eccentric movement of said cutting member, and said longitudinal member having expansible means embracing said longitudinal member for releasing said cutting member into contact with said cutting surface on limited movement of said wire line with respect to said body member from a first position to a second position.

5. A releasing socket for a wire line which comprises an elongated body member provided with a first chamber and a second chamber, a longitudinal member sealingly positioned in said body member to extend through said chambers, said longitudinal member having an axial passageway for receiving said wire line, means in said body member for clamping said wire line, compressible means in said first chamber operatively bearing against said longitudinal member and normally urging said longitudinal member to a first position, bleed means between said first chamber and said second chamber adapted to bleed hydraulic fluid in the first chamber to the second chamber, a cutting member arranged for movement on said wire line between the clamping means and the longitudinal member, a cutting surface formed by means in said body member in operative relationship with said cutting member for cutting said wire line on eccentric movement of said cutting member, said compressible means moving to a second position by tension exerted on said wire line to cause hydraulic fluid to bleed into said second chamber, and means on said socket for retrieving said socket after cutting of said wire line.

6. A releasing socket in accordance with claim 5 in which means are provided for attaching the socket to a wire line well tool.

7. A releasing socket for a wire line which comprises an elongated body member provided with a first chamber and a second chamber, said body member having a port for introducing hydraulic fluid into said first chamber, a longitudinal member sealingly positioned in said body member to extend through said chambers, said longitudinal member having an axial passageway for receiving said wire line, means in said body member for clamping said wire line, spring means in said first chamber operatively bearing against said longitudinal member and normally urging said longitudinal member to a first position, means between said first chamber and said second chamber adapted to bleed hydraulic fluid in the first chamber to the second chamber, a cutting member arranged for movement on said wire line between the clamping means and the longitudinal member, a cutting surface formed by means in said body member in operative relationship with said cutting member for cutting said wire line on eccentric movement of said cutting member, and spring means bearing against said body member and normally urging said cutting member away from said cutting surface, said spring means in said first chamber moving to a second position by tension exerted on said wire line to cause hydraulic fluid to bleed into said second chamber.

No references cited.